(12) United States Patent
Babu et al.

(10) Patent No.: US 8,015,796 B2
(45) Date of Patent: Sep. 13, 2011

(54) GAS TURBINE ENGINE WITH DUAL FANS DRIVEN ABOUT A CENTRAL CORE AXIS

(75) Inventors: Michael Babu, Fairfield, CT (US); Richard E. Domonkos, Wethersfield, CT (US); Philip Shacter, San Diego, CA (US)

(73) Assignee: United Technologies Corporation, Hartford, CT (US)

( * ) Notice: Subject to any disclaimer, the term of this patent is extended or adjusted under 35 U.S.C. 154(b) by 1370 days.

(21) Appl. No.: 11/758,023

(22) Filed: Jun. 5, 2007

(65) Prior Publication Data

US 2010/0011741 A1 Jan. 21, 2010

(51) Int. Cl.
*F02K 3/02* (2006.01)
(52) U.S. Cl. ........................... 60/226.1; 60/262
(58) Field of Classification Search ................. 60/39.15, 60/226.1, 226.2, 226.3, 262, 263, 269
See application file for complete search history.

(56) References Cited

U.S. PATENT DOCUMENTS

| | | | |
|---|---|---|---|
| 3,054,577 A * | 9/1962 | Wolf et al. | 60/226.1 |
| 3,659,422 A | 5/1972 | Hope | |
| 4,254,619 A | 3/1981 | Giffin | |
| 4,679,394 A | 7/1987 | Taylor | |
| 5,778,659 A | 7/1998 | Duesler | |
| 5,966,525 A | 10/1999 | Manzi | |
| 6,260,800 B1 | 7/2001 | Snell | |
| 6,409,469 B1 | 6/2002 | Tse | |
| 6,439,840 B1 | 8/2002 | Tse | |
| 6,792,745 B2 * | 9/2004 | Wojciechowski | 60/224 |
| 6,845,606 B2 | 1/2005 | Franchet | |
| 7,107,756 B2 | 9/2006 | Rolt | |
| 2008/0098719 A1 * | 5/2008 | Addis | 60/226.1 |

* cited by examiner

*Primary Examiner* — Louis Casaregola
(74) *Attorney, Agent, or Firm* — Carlson, Gaskey & Olds

(57) ABSTRACT

A gas turbine engine includes a compressor section, a combustor section and a turbine section, all arranged about a central axis. A turbine rotor drives a driveshaft for rotation on the central axis. The driveshaft in turn drives at least two fan rotors on axes parallel to, but spaced from, the central axis. The fan rotors each deliver a portion of the air they move into a central inlet for delivering the air to the compressor section. In addition, the majority of the air moved by the plurality of fan rotors passes between a cowl and an outer periphery of a housing for the central core of the engine. This bypass air provides propulsion as is known in the turbojet art.

1 Claim, 2 Drawing Sheets

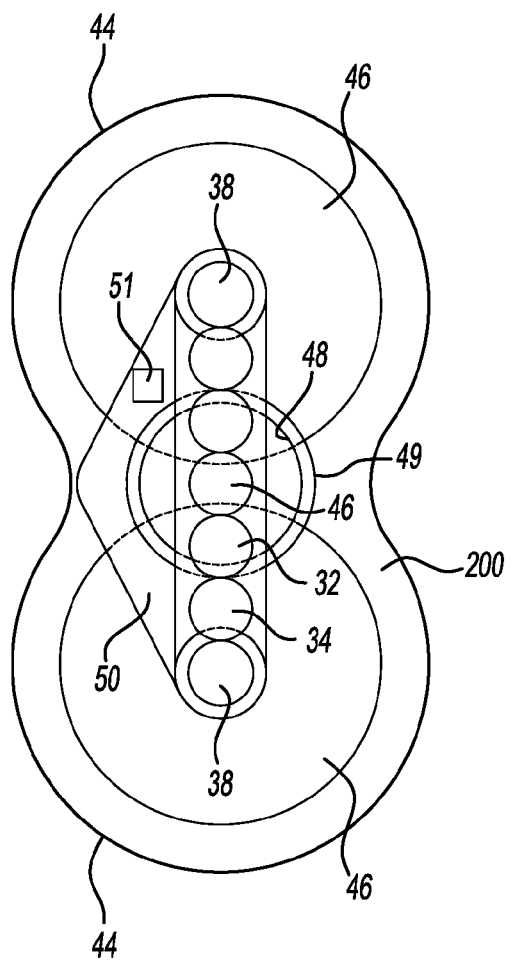
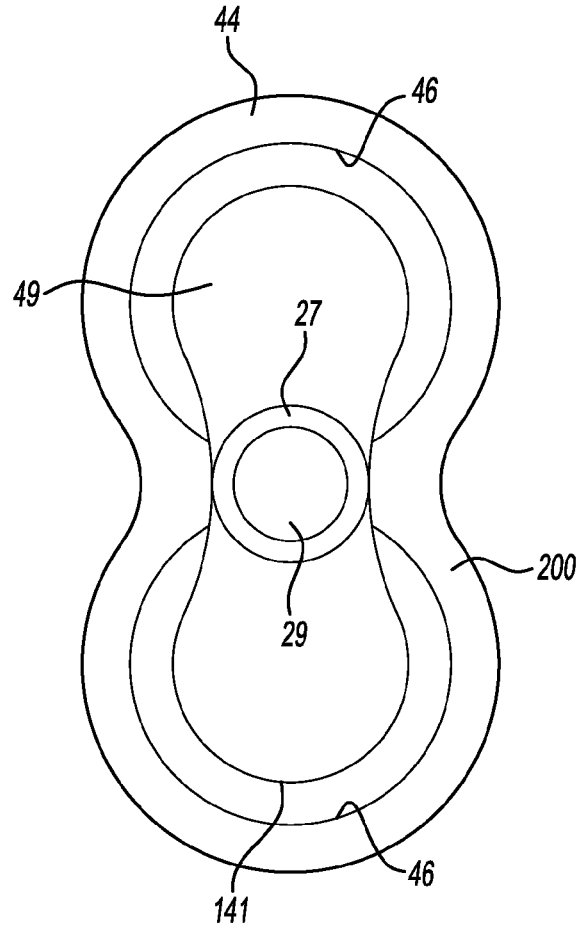

GAS TURBINE ENGINE WITH DUAL FANS DRIVEN ABOUT A CENTRAL CORE AXIS

BACKGROUND OF THE INVENTION

This application relates to a gas turbine engine.

Gas turbine engines are known, and typically include a single fan driven for rotation about a central axis. The fan delivers air to a plurality of compression stages. The air is compressed in the compression stages and delivered downstream into a combustor. In the combustor, the air is mixed with fuel and combusted. Hot products of this combustion are delivered downstream over turbine rotors. The turbine rotors are driven to rotate by the products of combustion, and in turn drive both the compressor and fan rotors.

Typically, the fans deliver a portion of the air to the compressors in a core of the engine, and the majority of the air outwardly between an outer housing shell of the engine, and an inner periphery of a cowl. This outer air flow moved by the fan provides additional propulsion, in addition to the propulsion delivered from the gas turbine engine core.

It has been proposed to have a gas turbine engine associated with a plurality of fan rotors. The fan rotors have typically been proposed with a single fan rotor aligned with the core of the engine, and auxiliary fan rotor spaced from this core, and solely delivering additional propulsion. While these arrangements do provide additional freedom to the design of the gas turbine engine, they increase the operational envelope of the gas turbine engine.

SUMMARY OF THE INVENTION

In the disclosed embodiment of this invention, a gas turbine engine includes a compression section, a combustor section, and a turbine section all spaced along a central axis. A plurality of fans are driven parallel to but spaced from the central axis. Each of the plurality of fans deliver a portion of the air they move to the compressor section (core flow), and another portion of the air for propulsion between an outer housing of a central core of the engine and an inner periphery of a cowl. This arrangement provides a smaller envelope for the dual fan gas turbine engine that has been provided in the prior art.

These and other features of the present invention can be best understood from the following specification and drawings, the following of which is a brief description.

BRIEF DESCRIPTION OF THE DRAWINGS

FIG. 2 is a front view of the gas turbine engine of this invention.

FIG. 3 is a rear view of the gas turbine engine of this invention.

DETAILED DESCRIPTION OF THE PREFERRED EMBODIMENT

Figure 1:
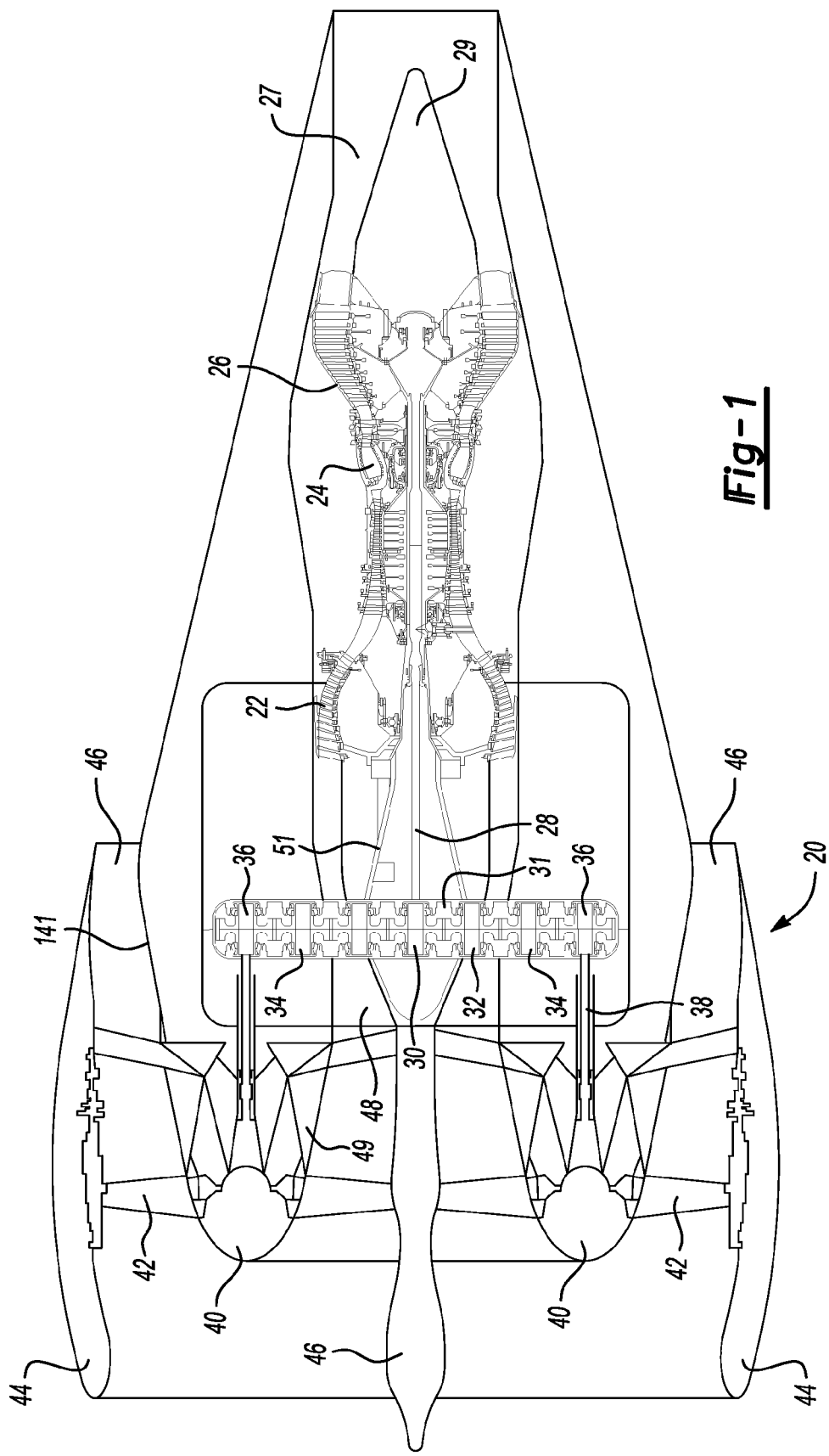
FIG. 1 is a cross-sectional view through a gas turbine engine according to the present invention.

FIG. 1 illustrates a gas turbine engine 20 incorporating a compressor section 22, a combustor section 24 and a turbine section 26. As known, air is delivered into the compressor section 22. Air is compressed and delivered into the combustor section 24. Fuel is mixed with the air in the combustor section 24 and combusted. Products of combustion are then delivered downstream over turbine rotors in the turbine section 26. The air exhausts through the exhaust nozzle 27. An exhaust cone 29 shapes the exhaust 27. The engine is shown quite schematically.

As known, the turbine rotors 26 drive a central driveshaft 28. The driveshaft 28 extends forwardly, and is supported within a housing 51. Housing 51 has a formed nose core 46.

A central inlet 48 leads inwardly of a housing 49, and delivers air to the compressor 22.

The driveshaft 28 drives a gear 31 driving the gear 32, which in turn drives gears 34, and gears 36. Gears 36 drive shafts 38 which each drive fan rotors 40. Fan rotors 40 rotate fan blades 42. Fan blades 42 deliver air into the inlet 48, and deliver a greater portion of the air into a bypass flow cross-sectional area 46. A cowl 44 defines the area 46 between its inner periphery and an outer periphery 141 of housing 49.

As known, turbofan engines deliver a great majority of the air moved by a fan into the bypass cross-sectional area 46. The present invention is distinct from existing gas turbine engines in that the fans 40 also each deliver air through the inlet 48 into the central core, and downstream to the compressor section 22.

In this manner, the present invention provides a smaller envelope for a dual fan gas turbine engine than has been provided in the prior art.

FIG. 2 shows further features, wherein the driveshafts 38 for the fans are shown associated with the bypass cross-sectional areas 46. As can be appreciated from this figure, the bypass cross-sectional areas 46 cover the great majority of the circumferential extent of the rotation axis about the axes of driveshafts 38. The inlets 48 extend for only a very small portion of the circumferential extent of rotation. Further, as can be appreciated, the inlet 48 is associated with a figure eight housing 200 which defines the cowls and bypass cross-sectional areas 46.

FIG. 3 shows a rear view, and illustrates the housing 49, and the housing 200. From this figure, the cone 29, and discharge cross-sectional area 27 can be understood, as can the bypass cross-sectional area 46.

Returning to FIG. 2, a triangular gearbox 50 may be associated with oil pumps 51, etc., for lubricating and housing the several gears 30, 32, 34, and 36.

The present invention provides a broad concept for a dual fan housing arrangement. It should be understood that any number of modifications to this basic idea would come within the scope of this invention. For that reason, the following claims should be studied to determine the true scope and content of this invention.

What is claimed is:

1. A gas turbine engine comprising:

a compressor section for receiving air from a core inlet, said compressor section for compressing the air and delivering it downstream to a combustor section, air being mixed with fuel in the combustor section and combusted, the products of the combustion for being delivered downstream over a turbine rotor, said turbine rotor rotating a central driveshaft about a central axis;

said central driveshaft extending forwardly to a gearbox, said gearbox driving a plurality of fans, with said fans rotating on axes parallel to, but spaced from said central axis;

each of said plurality of fans delivering a portion of air into said core inlet, a cowl surrounding a core housing, and with a majority of air moved by each of said plurality of fans being delivered into a bypass cross-sectional area between an inner periphery of said cowl and an outer periphery of said core housing;

there being two of said fans;

said cowl being defined by a figure-eight shaped housing, with each of said bypass cross-sectional areas being defined by one opening in said figure-eight shaped housing;

said core inlet formed near a central portion of said figure eight-shaped housing;

said gearbox including a plurality of gears driven by said central driveshaft to selectively drive said plurality of fans; and a circumferential extent of rotation of each of said fans is defined about the axes, and a majority of the circumferential extent being associated with said bypass cross-sectional area, with a small portion of the circumferential extent aligned with said core inlet.

* * * * *